D. B. MAZE.
Harrows.

No. 143,520. Patented Oct. 7, 1873.

Witnesses

Inventor

UNITED STATES PATENT OFFICE.

DAVID B. MAZE, OF WEST BUFFALO, OHIO.

IMPROVEMENT IN HARROWS.

Specification forming part of Letters Patent No. 143,520, dated October 7, 1873; application filed August 20, 1873.

*To all whom it may concern:*

Be it known that I, DAVID B. MAZE, of West Buffalo, in the county of Williams and State of Ohio, have invented a new and useful Improvement in Harrows, of which the following is a full, clear, and exact description, reference being had to the annexed drawing, in which—

Figure 1:
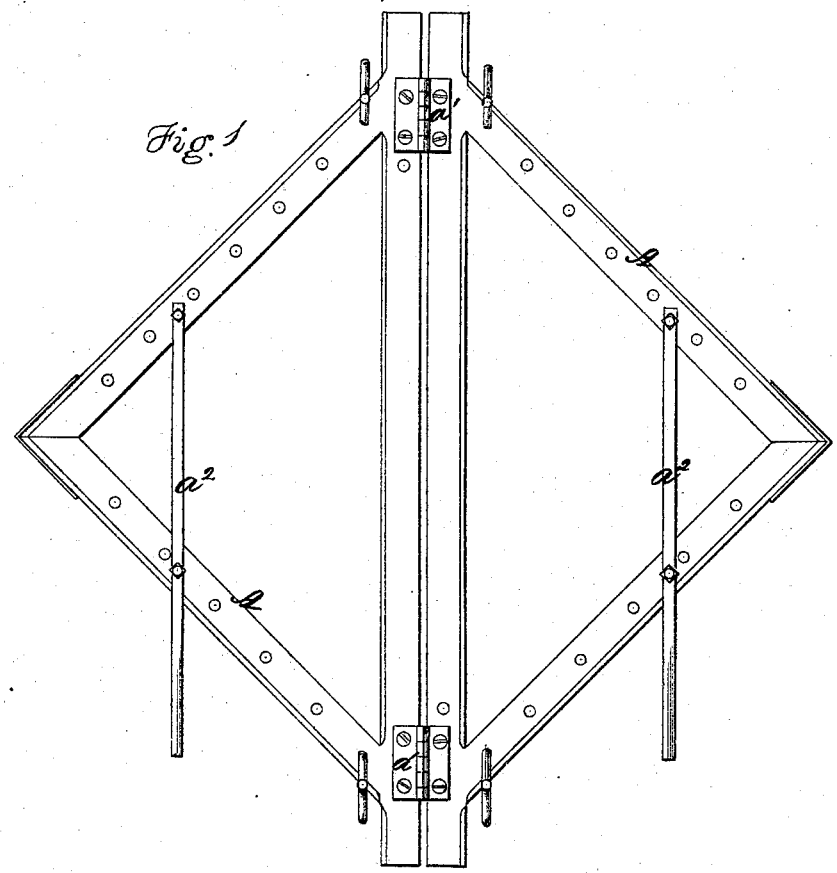
Figure 2:
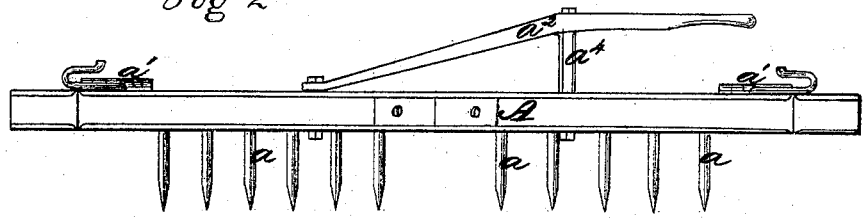
Figure 3:
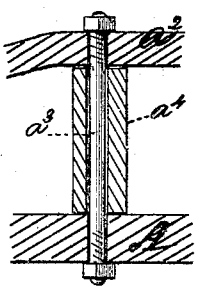

Figure 1 represents a plan view, and Fig. 2 a transverse vertical section, of my improved harrow. Fig. 3 is a detached sectional view of the same, showing the reversible mechanism for the handles.

Corresponding parts in the figures are designated by like letters of reference.

This invention relates to an improvement in harrows; and it consists in combining, with the frames thereof, handles which are rendered reversible through screw-bolts, rods, nuts, and tubular standards, substantially as hereinafter more fully set forth.

To enable others to make and use my invention, I will proceed to describe it.

In the annexed drawing, A A refer to the two triangles which constitute the frame or body of the harrow. These triangles are supplied with the ordinary harrow-teeth $a\ a$, suitably disposed thereon, and are hinged together, base to base, at the points $a^1\ a^1$. They are, further, provided with handles $a^2\ a^2$, which are made reversible through mechanism consisting of the screw-rods $a^3\ a^3$, embraced by tubular supports or standards $a^4\ a^4$ and screw-bolts $a^5\ a^5$, the former uniting those portions of the handles held in an elevated position, through the supports or standards $a^4\ a^4$, to the triangles A, and the latter connecting the lower ends of the handles thereto. Hooks or clevises are supplied to both ends of the triangles for the attachment thereto of chains or traces for hitching the animal or animals to the harrow, and for enabling the latter to be drawn from either end.

The parts of the harrow, being hinged together, can be thrown up at pleasure, so as to avoid contact or collision with any obstructing stone, stump, or other impediment that may be in the way of the harrow while in use or operation.

My harrow is characteristic for its simplicity of construction.

Having thus described my invention, what I claim, and desire to secure by Letters Patent, is—

The harrow-frames A A, having the handles $a^2\ a^2$, made reversible through the mechanism comprised of the screw-rods $a^3\ a^3$, tubular standards or supports $a^4\ a^4$, and screw-bolts and nuts, substantially as and for the purpose set forth.

In testimony whereof I have hereunto signed my name this 2d day of July, 1873, in presence of two subscribing witnesses.

DAVID B. MAZE.

Witnesses:
SIMEON GILLIS,
JOHN W. LEIDIGH.